United States Patent Office.

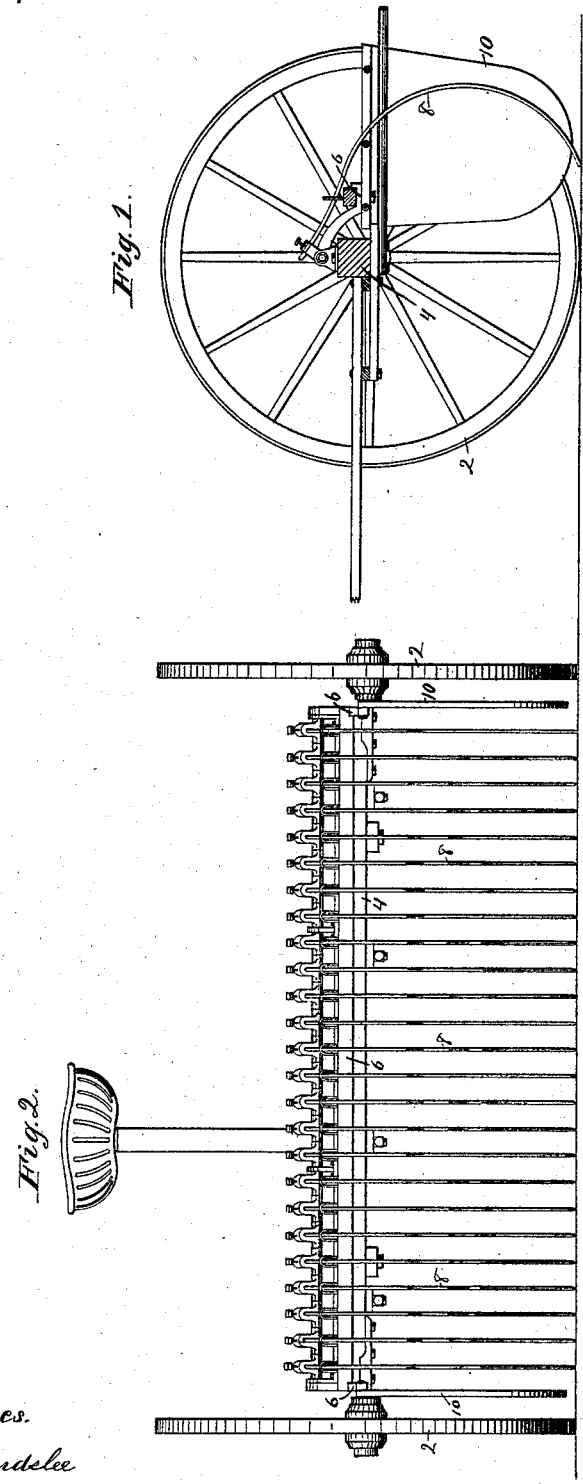

BARNEY DESAUTELS, OF GRAFTON, DAKOTA TERRITORY.

HORSE HAY-RAKE.

SPECIFICATION forming part of Letters Patent No. 388,401, dated August 28, 1888.

Application filed October 29, 1887. Serial No. 253,749. (No model.)

*To all whom it may concern:*

Be it known that I, BARNEY DESAUTELS, of Grafton, in the county of Walsh and Territory of Dakota, have invented certain new and useful Improvements in Hay-Rakes, of which the following is a specification.

My invention relates to improvements in horse hay-rakes; and the object that I have in view is to provide a rake of the class described, with shields or guards to prevent the hay from coming in contact with the spokes of the wheels as the rake is operated, and being twisted or forced out between the rake-teeth and the wheels, or being caught by the spokes and scattered over the raked surface of the field.

My invention consists in the construction and arrangement hereinafter described, and particularly pointed out in the claim.

In the drawings which form a part of this specification, Figure 1 is a longitudinal section of a portion of a hay-rake showing my improvement attached thereto. Fig. 2 is a rear elevation of my improved rake.

In the drawings, 2 represents the draft-wheels of an ordinary rake, which are mounted upon the axle 4. This axle also supports in the ordinary manner the pivoted tilting frame 6, to which the rake-teeth 8 are attached. Upon each extremity of the frame 6, and between the outer teeth and the wheels, I locate the plates or guards 10. These guards are preferably formed, as shown in Fig. 1, semicircular at the bottom and sufficiently wide to substantially cover the ends of the portion of the rake in which the hay is gathered.

The guards 10 are attached by suitable supports to the tilting frame, with which they are raised and extend downward nearly to the surface of the ground. The guards are preferably constructed of wood, in order to make them as light as possible.

It will be seen that by locating the said guards at either end of the rake between the two outer rake-teeth and the wheels the hay which is gathered by the teeth will be retained by the said guards and prevented from coming in contact with the wheels, and thus all the hay can be gathered at one operation and a great saving made in time in going over the field, as by my improvement it makes it possible to rake a wider path than with a machine of the ordinary construction.

By protecting the wheels from the hay the rake is allowed to run much more easily and all the waste by scattering, caused by the spokes of the wheels coming in contact with the hay, is prevented.

I do not confine myself to the construction as herein described, as other forms may be used without departing from my invention.

Another of the advantages of my improvement is that as the hay is gathered by the teeth of the rake and is prevented from being dragged or twisted out at the ends it will be left in the windrow in such a manner as to be more easily cocked and handled than when raked with the ordinary rake.

I claim as my invention—

In a hay-rake, the combination, with the wheels 2 and axle 4, of the tilting frame 6, pivoted upon said axle, the teeth 8, carried by said frame and moving therewith, and the end plates or guards, 10, secured to said frame 6, between the outer rake-teeth and the wheels and moving with said frame and teeth, substantially as described.

In testimony whereof I have hereunto set my hand this 17th day of October, 1887.

BARNEY DESAUTELS.

In presence of—
 O. M. FRARER,
 WESLEY HOOPLE.